(12) United States Patent
Fan

(10) Patent No.: US 6,279,610 B1
(45) Date of Patent: Aug. 28, 2001

(54) VALVE FOR A BATHROOM FAUCET

(76) Inventor: Chen-Yueh Fan, Room F/23, 4th Fl., No. 5, Sec. 5, Hsinyi Rd., Taipei (TW)

( * ) Notice: Subject to any disclaimer, the term of this patent is extended or adjusted under 35 U.S.C. 154(b) by 0 days.

(21) Appl. No.: 09/568,924

(22) Filed: May 11, 2000

(51) Int. Cl.[7] .................................................. F16K 11/04
(52) U.S. Cl. ...................................... 137/625.48; 251/100
(58) Field of Search ....................... 251/100; 137/625.48, 137/872

(56) References Cited

U.S. PATENT DOCUMENTS

| | | | |
|---|---|---|---|
| 4,503,877 | * 3/1985 | Ward et al. | 137/119.03 |
| 4,880,029 | * 11/1989 | Koller | 137/329.06 |
| 5,141,016 | * 8/1992 | Nowicki | 137/118.07 |

* cited by examiner

*Primary Examiner*—John Fox
(74) *Attorney, Agent, or Firm*—William E. Pelton, Esq.

(57) ABSTRACT

A valve for a faucet includes a body, a spacer fitted to the top of the body, a plunger slidingly received in a bore of the body and a tip thereof protruding from the spacer, a knob secured to the tip of the plunger, and a seat secured to a bottom of the body. The body further includes top and bottom openings, and a side entry and a side exit. A water source is connected to the entry. A first outlet is connected is connected to the side exit, and a second outlet is connected to the bottom opening. In a first flow mode, water travels from the side entry to only the side exit. In a second flow mode, water travels from the side entry to only the bottom opening of the bore. In a third flow mode, water travels from the side entry to both the side exit and the bottom opening, in a definite manner.

7 Claims, 7 Drawing Sheets

VALVE FOR A BATHROOM FAUCET

BACKGROUND OF THE INVENTION

1. Field of the Invention

The present invention relates to a valve for a bathroom faucet and, more particularly, to a bathroom faucet with which a user can select three modes of water flow.

2. Description of Related Art

While showering, a person may require at one time more than a single outlet of water from a shower device. As shown in FIGS. 6 and 7, a prior art bathroom faucet includes a valve (70) leading to both a fixed rose (not shown) attached by a pipe and a movable rose (not shown) attached to the valve by a hose. The valve includes a body (72), a plunger (73) with two spaced-apart flanges (74), a seat (76), a spacer (78), and a knob (79). The body (72) comprises a bore (722) with a top opening (724) and a bottom opening (726), and a side entrance (727) and a side exit (728). The bore (722) slidably receives therein the plunger (73) and the flanges (74) seal the bore (722). The seat (76) is fitted to the bottom opening (726) and defines a passage which communicates with the bottom opening (726) and leads to the movable rose. The spacer (78) is mounted securely to the body (72) to communicate with the top opening (724). A threaded top portion of the plunger (73) extends through the top opening (724) and the spacer (78) to engage with the knob (79). A staggered passage extends between the side entrance (727) and exit (728) and communicates with the bore (722).

In a first position as shown in FIG. 6, the plunger (73) is in a lower position whereby a lower one of the flanges (74) blocks the bottom opening (726) and the upper one of the flanges (74) is above the side exit (728), such that water can flow from the entrance (727) to the fixed rose.

FIG. 7 shows the plunger (73) in an upper position whereby the lower of the flanges (74) blocks the staggered passage and water can flow to the movable rose via the bottom opening (726). Thus a user may direct the stream of water in a hands-free mode, as shown in FIG. 6, or hold the movable rose to conveniently direct the stream at will, as shown in FIG. 7. However, the valve (70) can be operated in only two positions respective to the individual use of the fixed and movable roses, and thus a user is denied the advantage of simultaneous use thereof. Although a user may try to position the knob (79) such that water can simultaneously flow through both the bottom opening (726) and the side exit (728), it is found that the pressure of the water pushes the lower of the flanges (74) up to block the side exit (728). A user may experience irritation while unsuccessfully trying to maintain the knob (79) in the desired position, particularly so when having soapy hands.

SUMMARY OF THE INVENTION

The object of the present invention is to provide a valve for a bathroom faucet with which a user can select between a first outlet only, a second outlet only, and simultaneous use of the first and second outlets.

Other objects, advantages, and novel features of the invention will become more apparent from the following detailed description when taken in conjunction with the accompanying drawings.

DETAILED DESCRIPTION OF PREFERRED EMBODIMENT

Figure 1:
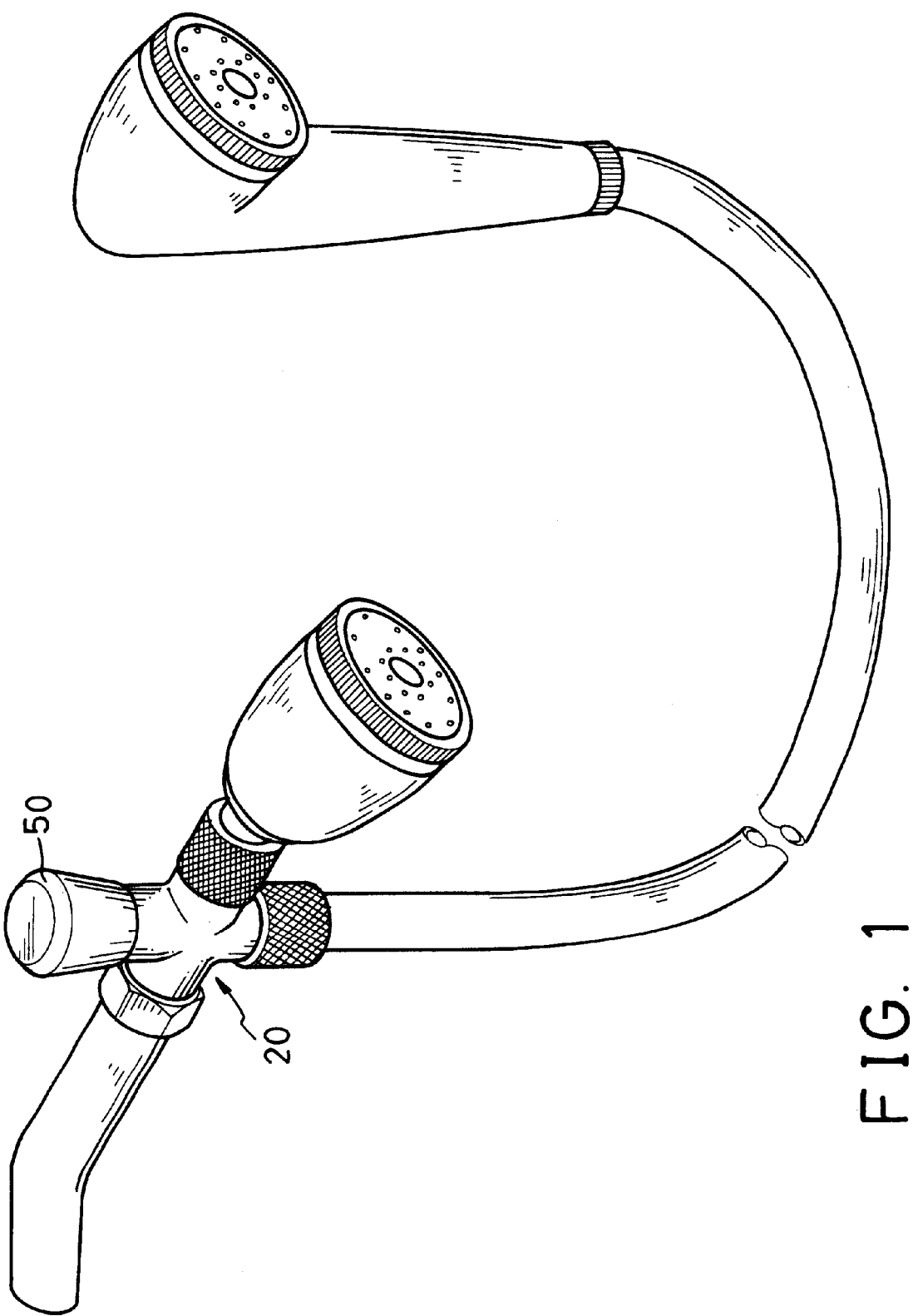
FIG. 1 is a perspective view of a valve for a bathroom faucet in accordance with the present invention.
Figure 2:
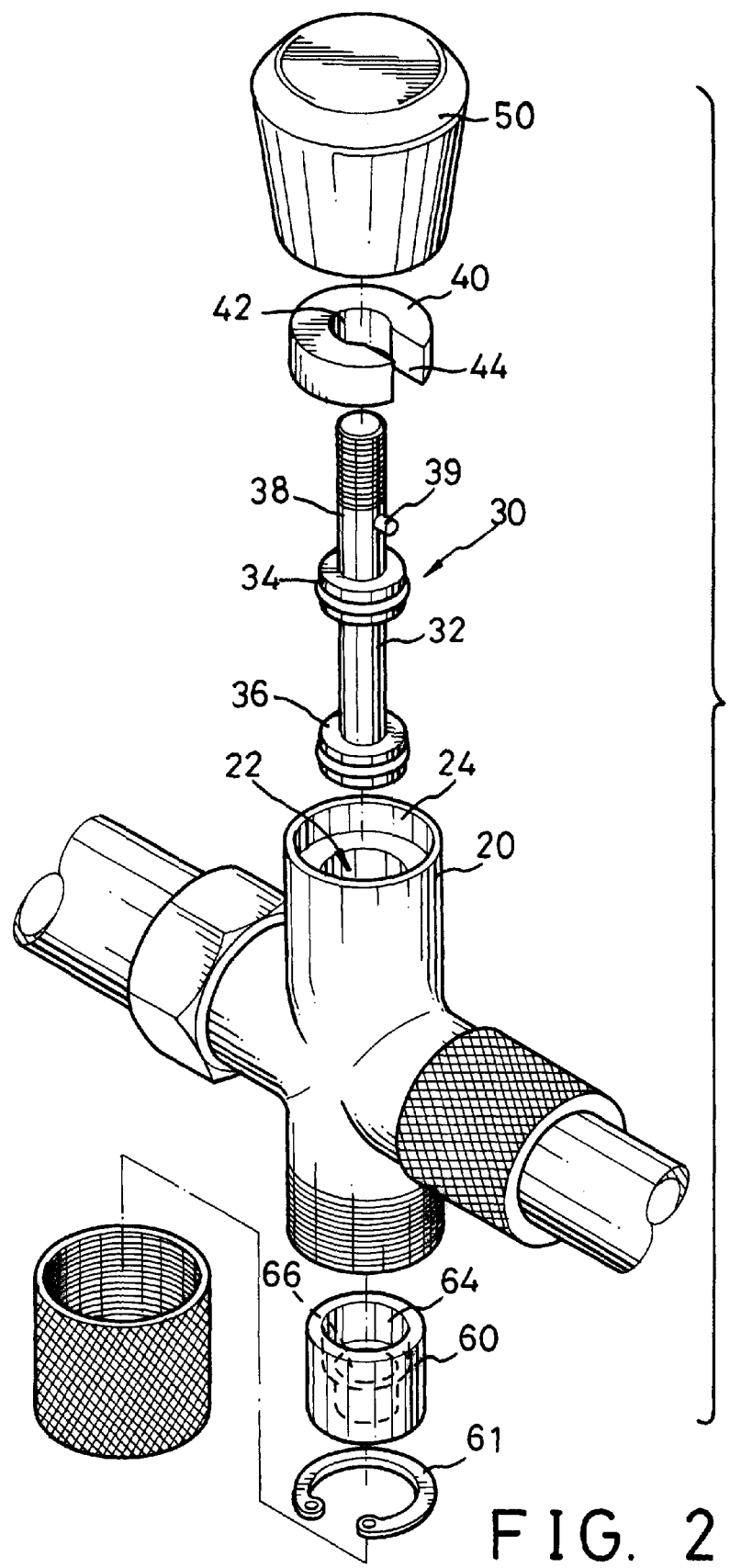
FIG. 2 is an exploded perspective view of the valve shown in FIG. 1.

Referring to FIGS. 1 and 2, a valve for a bathroom faucet comprises a water pipe (10), a valve assembly, a first shower rose, a second shower rose, and a tube which are connected in a conventional manner and thus not described in detail hereinafter.

The valve assembly includes a body (20), a plunger (30), a spacer (40) shaped as a "C", a knob (50), and a seat (60).

Referring to FIG. 2, the spacer (40) has a through hole (42) and a slot (44) extending from an outer periphery thereof to the through hole (42). The plunger (30) includes a rod (32), an upper flange (34) and a lower flange (36) respectively formed at top and bottom ends of the rod (32), and a shank (38) integrally extending from a top face of the upper flange (34). Both flanges (34, 36) have a same outer diameter. The shank (38) has a plain bottom portion and a threaded top portion. A peg (39) extends radially from an outer periphery of the plain portion of the shank (38) and has an outer diameter slightly smaller than a width of the slot (44), whereby the peg (39) can pass from below to above the spacer (40). A distance between the peg (39) and the top face of the upper flange (34) is slightly larger than a length of the spacer (40). Each flange (34, 36) has a gasket (not numbered) fitted to a groove in an outer periphery thereof.

Figure 3:
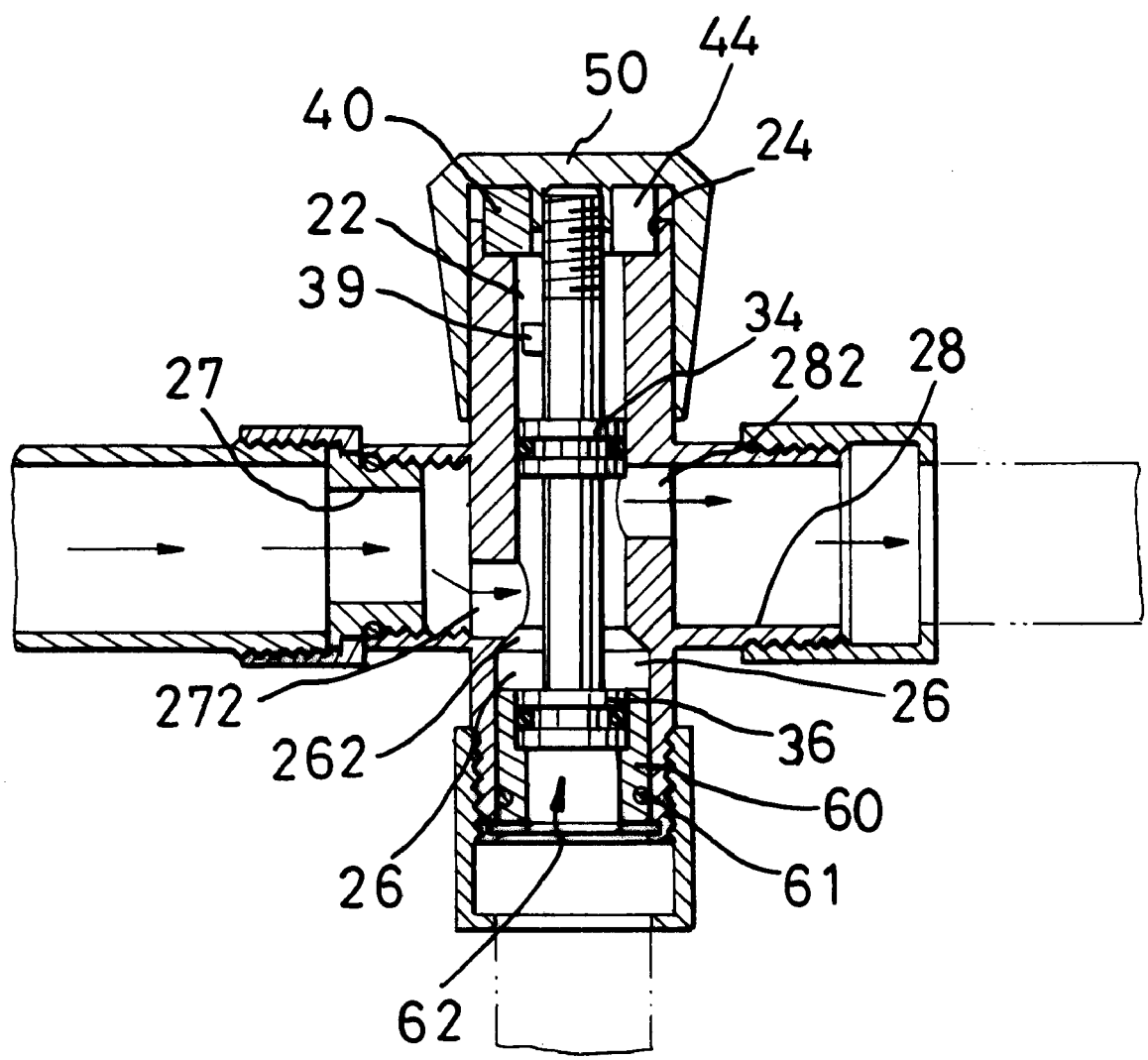
FIG. 3 is a cross-sectional view of the valve taken along line 3—3 of FIG. 1, showing a first flow mode.
Figure 5:
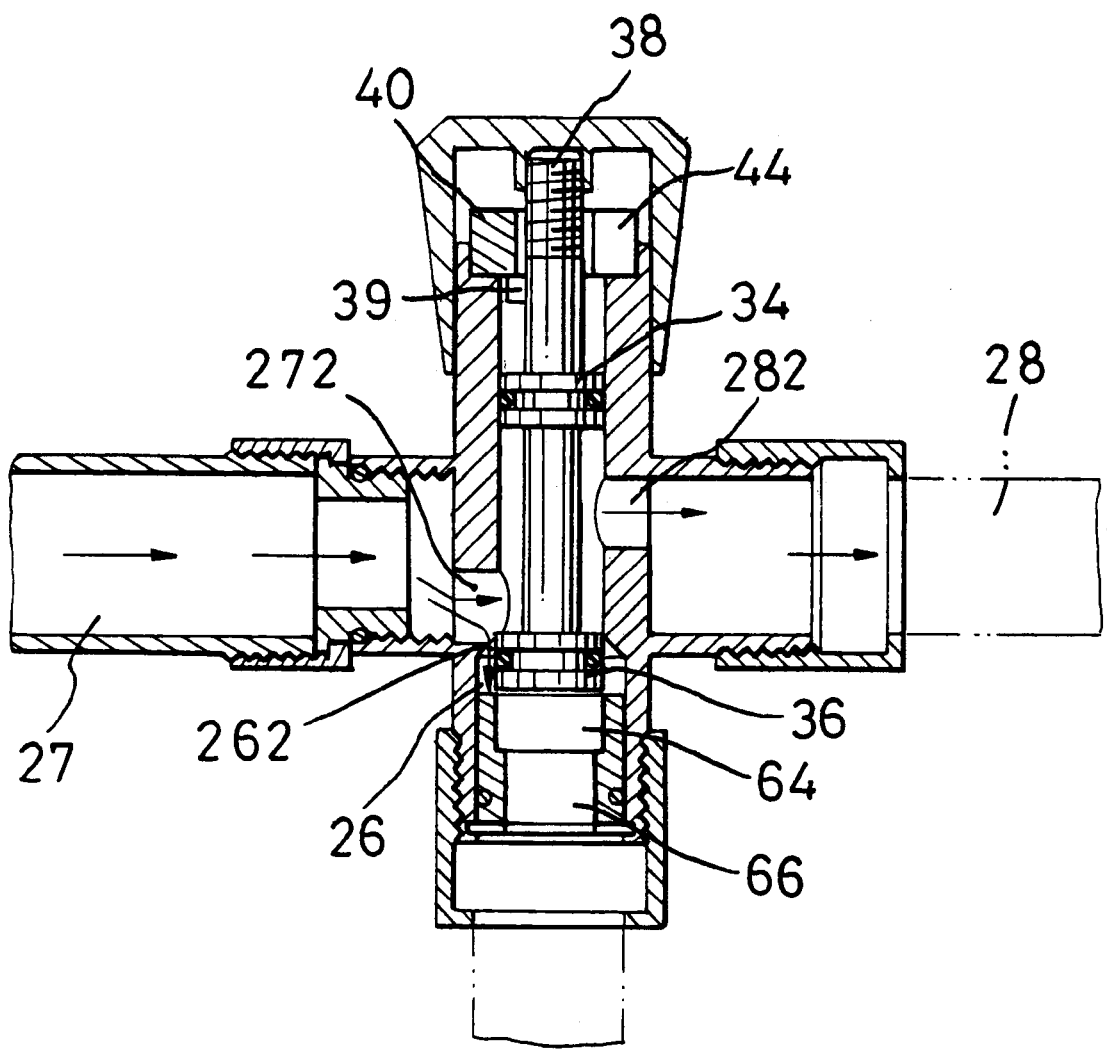
FIG. 5 is a cross-sectional view of the valve taken along line 3—3 of FIG. 1, showing a third mode.
Figure 6:
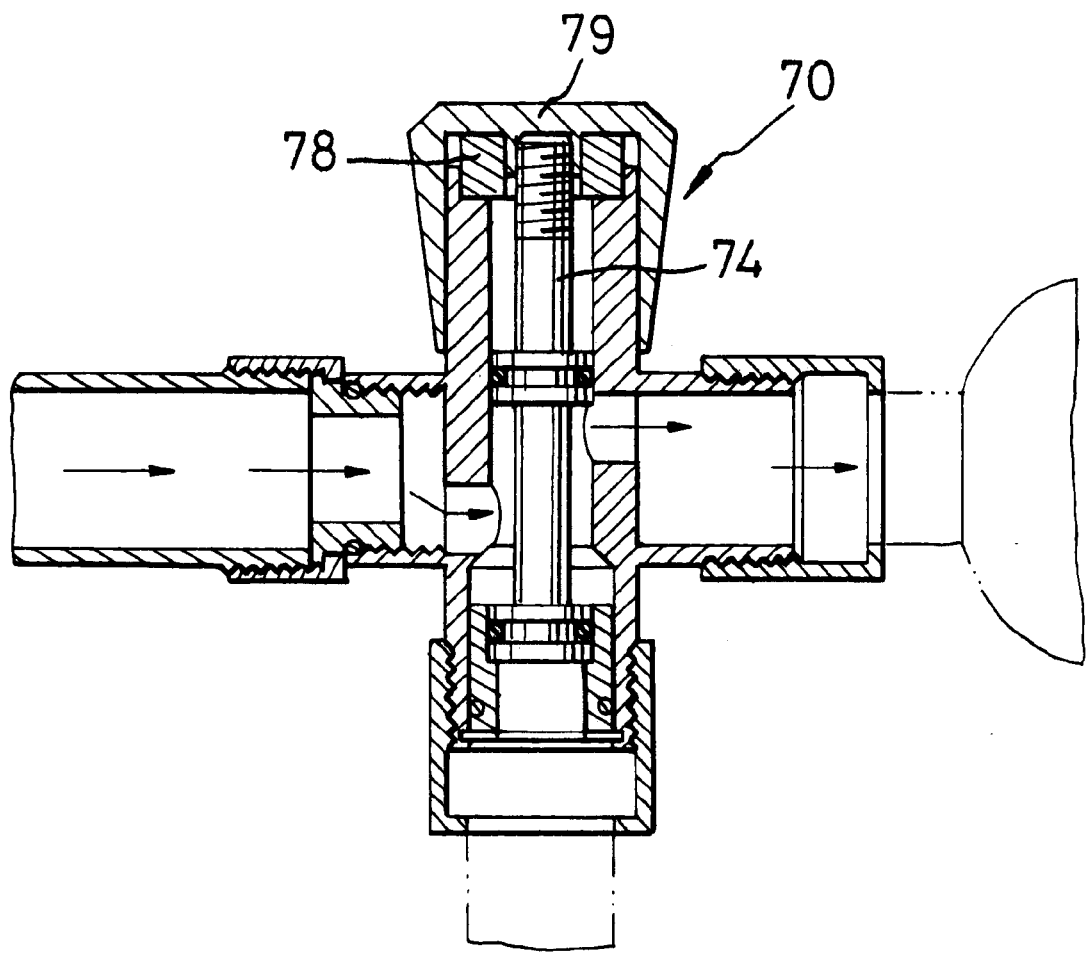
FIG. 6 is a cross-sectional view of a prior art valve for a faucet, showing a first flow mode.
Figure 7:
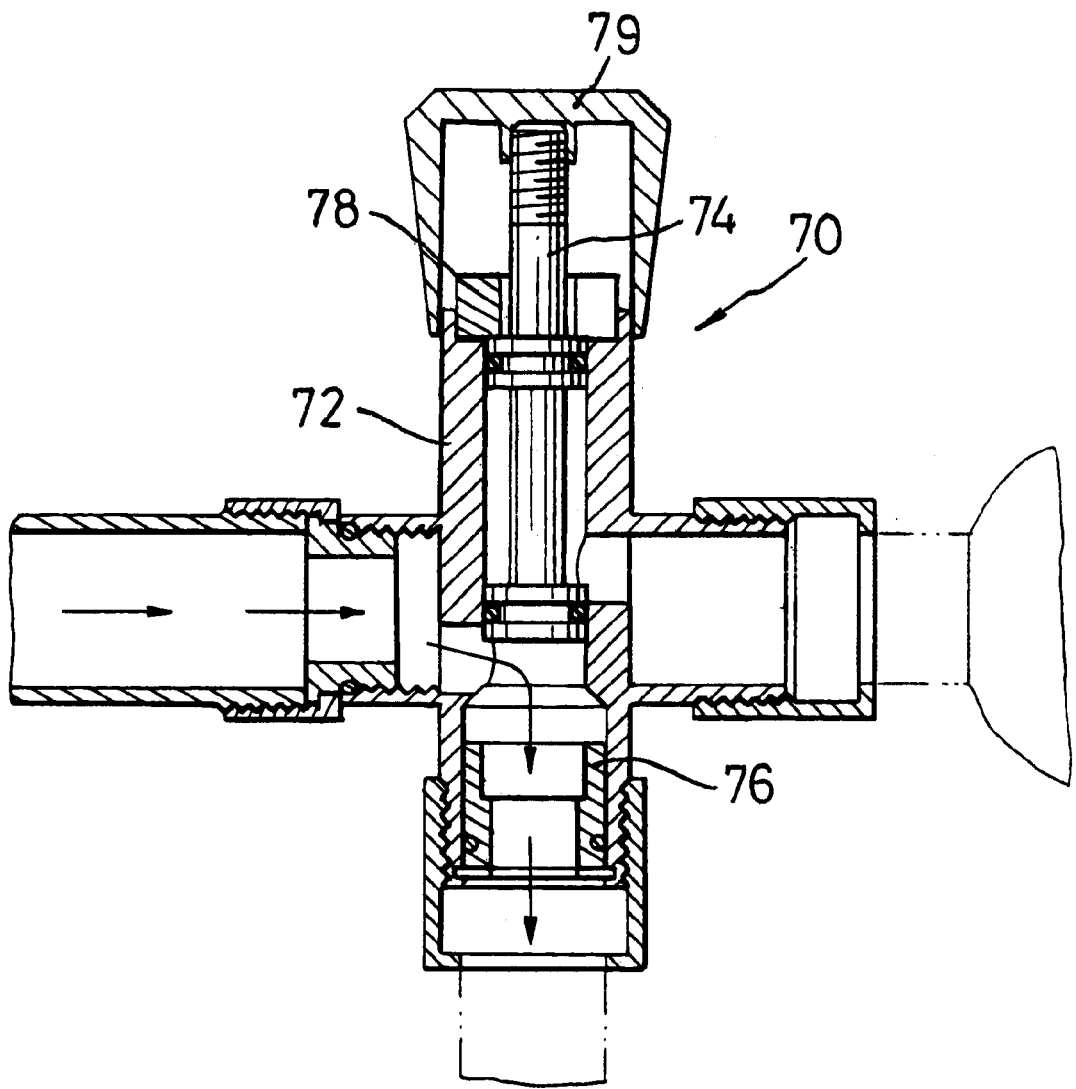
FIG. 7 is a cross-sectional view of the prior art valve of FIG. 6, showing a second flow mode.

Referring to FIGS. 2, 3 and 5, the seat (60) defines a channel (62) with a large top opening (64) and a small bottom opening (66). The top opening (64) is sized to sealably receive the lower flange (36).

Figure 4:
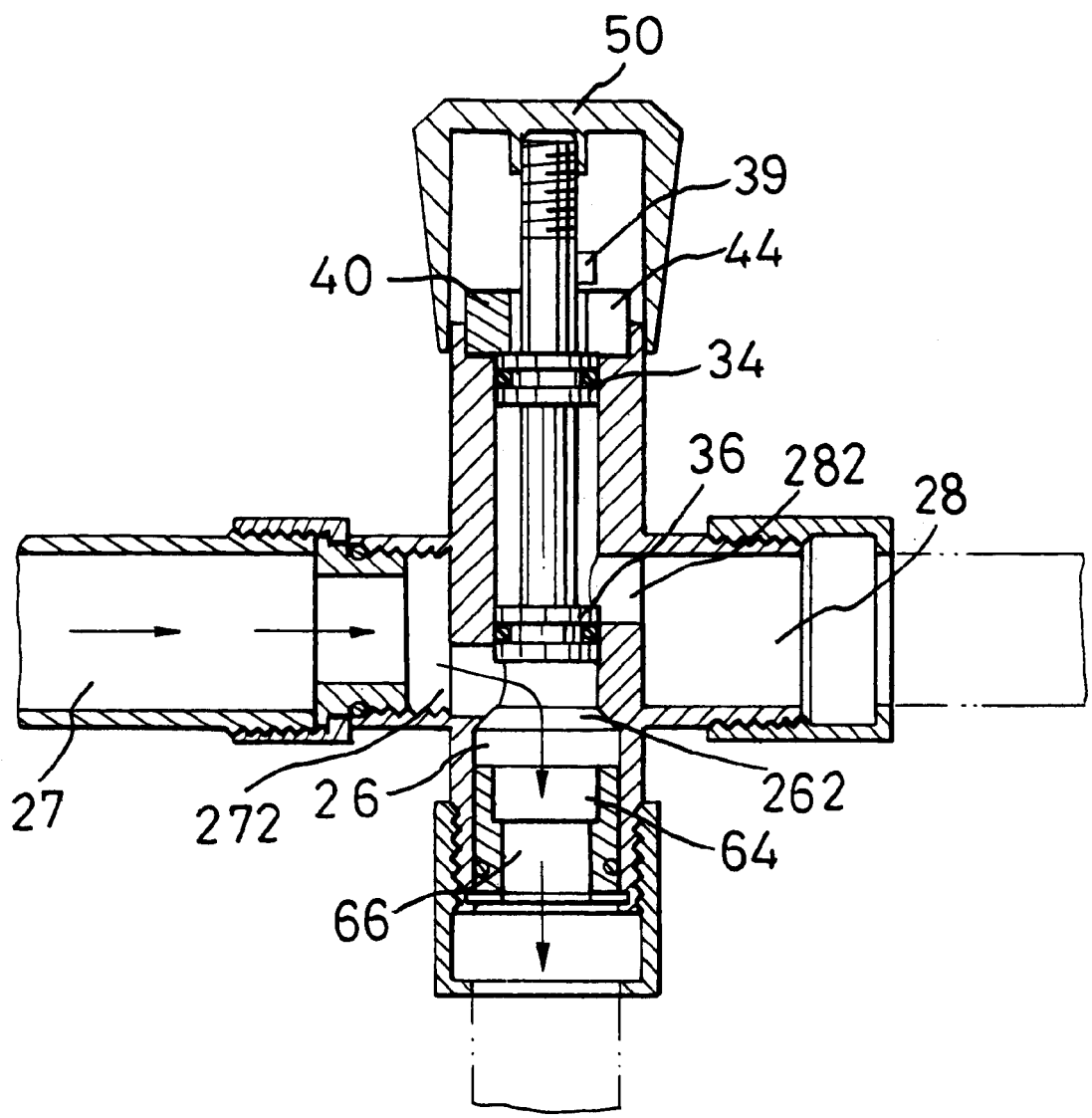
FIG. 4 is a cross-sectional view of the valve taken along line 3—3 of FIG. 1, showing a second flow mode.

Referring to FIGS. 2, 3 and 4, the body (20) defines a bore (22), a top counter bore (24), a bottom counter bore (26), an entrance (27) formed on one side of an outer periphery, and an exit (28) formed on a second side of the outer periphery. The entrance (27) and exit (28) communicate with the bore (22) and form a passage (not numbered). The passage includes a first neck (272) in the entrance (27) and a second neck (282) in the exit (28). The first and second necks (272, 282) are staggered. The top counter bore (24) is sized to securely receive the spacer (40) such that the through hole (42) aligns with the bore (22). The bottom counter bore (26) is sized to receive an outer circumference of the seat (60). A chamfer (262) connects the bottom counter bore (26) with the first neck (272). The bore (22) is sized to sealably receive the outer peripheries of the flanges (34, 36), including the gaskets.

In assembly, referring to FIGS. 3, 4 and 5, the seat (60) is secured by a "C" clip (61) in the bottom counter bore (26), with the top opening (64) facing the bore (22). The plunger (30) is received in the bore (22), with the lower flange (36) movably extending into the top opening (64) of the seat (60), as shown in FIG. 3, and the upper flange (34) movably extending to a bottom face of the spacer (40), as seen in FIG. 4. The spacer (40) is securely received in the top counter bore (24). The threaded top portion of the plunger (30)

extends through the through hole (42) of the spacer (40), and threadedly engages with the knob (50).

FIG. 3 shows a first flow mode in which the lower flange (36) is urged against the seat (60) by pressure of water passing along from the entrance (27) to the passage, whereby the channel (62) of the seat (60) is sealed, and the upper flange (34) seals a portion of the bore (22) above the second neck (282) to direct the flow of water to the first rose via the exit (28).

FIG. 4 shows a second flow mode in which the peg (39) has traveled through the slot (44) and the knob (50) then was turned such that the peg (39) abuts the top face of the spacer (40), whereby the plunger (30) is locked in position such that the lower flange (36) blocks the second neck (282) and water flows to the second rose via the channel (62) of the seat (60).

To achieve a third flow mode shown in FIG. 5, the knob (50) was first turned to align the peg (39) with the slot (44), after which the knob (50) was then pushed down such that the peg (39) traveled to below the spacer (40), and finally the knob (50) was turned again such that the peg (39) abuts the bottom face of the spacer (40). In this mode, water flows to the channel (62) via the chamfer (262), and the upper flange (34) is urged against the bottom face of the spacer (40) by flow of water through the second neck (282). In each of the three modes of the valve, a user does not have to continually hold the knob (50).

The improved valve of the present invention has the advantage of a user being able to definitely select one of three water flow modes, and remains able to use both hands to shower.

Although the present invention has been explained in relation to its preferred embodiment, it is to be understood that many other possible modifications and variations can be made without departing from the spirit and scope of the invention as hereinafter claimed.

What is claimed is:

1. A valve for a bathroom faucet having a first outlet and a second outlet, the valve comprising:

a body including a first opening receiving an adjustment device therein, the adjustment device comprising a spacer with a through hole and a slot in communication with the through hole, a second opening in communication with the first outlet, a third opening in connection with a water source, a fourth opening in communication with the second outlet, a bore in communication with the first and second openings, and a staggered passage extending between the third and fourth openings and in communications with the bore; and a plugging device comprising a rod with two flanges respectively formed at two ends thereof, and a shank extending from a top face of an upper one of the flanges and having a threaded distal tip, and a peg extending radially from the shank and between the distal tip and the top face of the upper flange, the plugging device being received in the bore and movable among a first flow mode whereby the first and second openings are securely sealed by the plugging device and the peg is below the spacer, and the third and fourth openings can receive therethrough a flow of water, a second flow mode whereby the first and fourth openings are securely sealed by the plugging device, the peg abuts an upper face of the spacer and the second and third openings can receive therethrough a flow of water, and a third flow mode whereby the first opening is securely sealed by the plugging device, the peg abuts a lower face of the spacer and the second, third and fourth openings can receive therethrough a flow of water.

2. The valve as claimed in claim 1, wherein the threaded tip of the plunger has threadedly engaged therewith a knob.

3. The valve as claimed in claim 1, wherein the bore includes a counter bore and a chamfer extending between the bore and the counter bore, and the flanges have an outer periphery sized to be slidably received in the bore.

4. The valve as claimed in claim 1, wherein the fourth opening comprises a seat defining a channel with a large end and a small end, and a retainer securing the seat to the body, wherein a lower one of the flanges is sealingly receivable in the large end.

5. A valve for a bathroom faucet, comprising:

a body defining a bore with a top, and a bottom in communication with a movable outlet, an entry in communication with the bore, and an exit in communication with the bore and in further communication with a fixed outlet;

a plunger slidingly received in the bore, and having two spaced-apart flanges and a shank extending from a top face of an upper one of the flanges, the shank having a peg extending radially from a mid portion thereof, and further having a distal tip protruding from the top of the bore;

a seat securely received in the bottom opening, and defining a channel in communication with the bore, and into which the lower flange is sealingly receivable;

a spacer securably received in the top opening of the bore, and defining a through hole through which the distal tip of the plunger extends, and further defining a slot in communication with the through hole and through which the peg can pass to abut a top face or a bottom face thereof or remain below the bottom face thereof; and a knob fixed to the distal tip of the plunger, whereby the plunger is extendable among a first flow mode wherein in a first flow mode the top and the bottom of the bore are blocked and the entry and the exit are open such that water can flow water therethrough, and in a second flow mode the top of the bore and the exit are blocked and the entry and bottom of the bore are open such that water can flow therethrough, and in a third flow mode the top of the bore is blocked and the bottom of the bore, the entry and the exit are open such that water can flow therethrough.

6. The valve as claimed in claim 5, wherein both of the flanges have a gasket fitted to an outer periphery thereof.

7. The valve as claimed in claim 5, wherein a staggered passage communicates the entry and the exit via the bore, and a lower one of the flanges extends to the bottom of the bore in the first flow mode, below an upper edge of the entry and above a lower edge of the exit in the second flow mode, and above the lower edge of the entry and below the upper edge of the entry in the third flow mode.

* * * * *